(12) United States Patent
Jones et al.

(10) Patent No.: US 9,392,035 B1
(45) Date of Patent: *Jul. 12, 2016

(54) SYSTEMS AND METHODS FOR SETTING UP A COLLABORATIVE COMMUNICATION SYSTEM

(71) Applicant: OPEN INVENTION NETWORK, LLC, Durham, NC (US)

(72) Inventors: Dan Jones, Niwot, CO (US); Todd Vernon, Lafayette, CO (US); Emmanuel Puentes, Erie, CO (US); Charles Wanek, Boulder, CO (US); William Marcum, Louisville, CO (US)

(73) Assignee: Open Invention Network, LLC, Durham, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/688,185

(22) Filed: Apr. 16, 2015

Related U.S. Application Data

(63) Continuation of application No. 14/017,368, filed on Sep. 4, 2013, now Pat. No. 9,077,738, which is a continuation of application No. 10/826,865, filed on Apr. 16, 2004, now Pat. No. 8,547,879, which is a continuation of application No. 10/676,899, filed on Sep. 30, 2003, now Pat. No. 7,701,882.

(51) Int. Cl.
| | | |
|---|---|---|
| *H04L 12/16* | (2006.01) | |
| *H04L 29/06* | (2006.01) | |
| *H04L 29/08* | (2006.01) | |
| *H04L 12/18* | (2006.01) | |

(52) U.S. Cl.
CPC ............ *H04L 65/1069* (2013.01); *H04L 63/08* (2013.01); *H04L 65/403* (2013.01); *H04L 67/14* (2013.01); *H04L 12/1813* (2013.01)

(58) Field of Classification Search
None
See application file for complete search history.

(56) References Cited

U.S. PATENT DOCUMENTS 6,600,725 B1 * 7/2003 Roy ................... H04L 12/1827
348/14.09
7,139,797 B1 * 11/2006 Yoakum .............. H04L 65/1096
709/204

* cited by examiner

*Primary Examiner* — Michael J Moore, Jr.
(74) *Attorney, Agent, or Firm* — Haynes and Boone, LLP

(57) ABSTRACT

A collaborative communication system comprises a highly flexible architecture that facilitates connecting communication devices and networks to establish multimedia collaboration sessions in a manner that allows distribution of various services and features throughout the collaborative communication system to provide scalability and selectable combination of cost, resource usage, and performance.

20 Claims, 7 Drawing Sheets

SYSTEMS AND METHODS FOR SETTING UP A COLLABORATIVE COMMUNICATION SYSTEM

RELATED APPLICATIONS INFORMATION

This application claims the priority as a continuation application under 35 U.S.C. §120 to U.S. patent application Ser. No. 14/017,368, entitled "SYSTEMS AND METHODS FOR SETTING UP A COLLABORATIVE COMMUNICATION SYSTEM," filed on Sep. 4, 2013, which is a continuation of U.S. patent application Ser. No. 10/826,865, entitled "SYSTEMS AND METHODS FOR SETTING UP A COLLABORATIVE COMMUNICATION SYSTEM," filed on Apr. 16, 2004, issued U.S. Pat. No. 8,547,879, issued on Oct. 1, 2013, which is a continuation of U.S. patent application Ser. No. 10/676,899, entitled "SYSTEMS AND METHODS FOR COLLABORATIVE COMMUNICATION," filed on Sep. 30, 2003, issued U.S. Pat. No. 7,701,882, issued on Apr. 20, 2010, which are incorporated herein by reference in their entirety. This application is related to commonly assigned U.S. patent application Ser. No. 10/826,865, entitled "SYSTEMS AND METHODS FOR SETTING UP A COLLABORATIVE COMMUNICATION SYSTEM,", filed on Apr. 16, 2004, issued U.S. Pat. No. 8,547,879, issued on Oct. 1, 2013, also incorporated herein by reference in its entirety.

FIELD OF THE INVENTION

This invention relates generally to the use of communication devices and networks to facilitate human communications, interaction, more specifically, to facilitate collaborative communication sessions among a plurality of participants.

BACKGROUND OF THE INVENTION

In the course of conducting activities involving multiple parties, a need often arises for people to meet and share information, exchange data or documents, discuss topics of mutual interest, or collaborate in preparing various documents or other work product. It may not be desirable, or possible, for all of the participants in a meeting to be in the same physical location at the same time, in which case meeting objectives may be achieved using various communication equipment and networks as tools for facilitating remote collaboration in a multimedia collaboration session. It can be useful for such a session to include a variety of media types that include the participants' voices, video images, shared documents, text messages, drawings, computer screen images, etc. . . . .

Several systems exist for configuring various devices and networks into collaboration sessions. For example, multimedia collaboration systems require many components and resources such as server equipment, networking equipment, and media processing and distribution. Session participants may be distributed in a wide variety of locations, e.g., in the same building, multiple buildings, across a city, across a country, or internationally. Thus, the communication links between participants vary greatly in quality, bandwidth, and usage cost.

Conventional multimedia collaboration architectures can be divided into two basic architectures: central-server and peer-connected. In a central-server architecture, all participant clients communicate with a single server that performs control, routing, and media processing functions. The server is located at a point in the network topology that is often not optimal for a given session's participants. In addition, a central server architecture provides all media services from a single point in the network, preventing separation of media services and further preventing location of specific media services at optimal points in the network. Accordingly, it is often not possible to provide the best combination of cost, performance, and bandwidth usage for a session's participants.

In a peer-connected architecture, participant clients communicate directly with one another. This architecture makes central control and coordination difficult, and also limits the size and media capability of the conference, there being no way to perform tasks requiring aggregate media processing, such as audio mixing or video switching between speakers.

Conventional collaboration systems also often require participants in sessions using certain media types, such as video, to install expensive equipment, use specialized conference rooms, or maintain high-performance network connections. Moreover, collaboration systems in use today, often limit the performance experienced by all participants to that provided by the slowest network connection. Other existing systems offer a degree of flexibility in location of components, but are limited to a single media type. The telephone system is an example of such a system.

SUMMARY OF THE INVENTION

A collaborative communication system comprises a highly flexible architecture that facilitates connecting communication devices and networks to establish collaboration sessions in a manner that allows distribution of various services and features throughout the collaborative communication system to provide scalability, and selectable combination of cost, resource usage, and performance.

These and other features, aspects, and embodiments of the inventions are described below in the section entitled "Detailed Description of the Preferred Embodiments."

BRIEF DESCRIPTION OF THE DRAWINGS

Features, aspects, and embodiments of the inventions are described in conjunction with the attached drawings, in which.

DETAILED DESCRIPTION OF THE INVENTION

Figure 1:
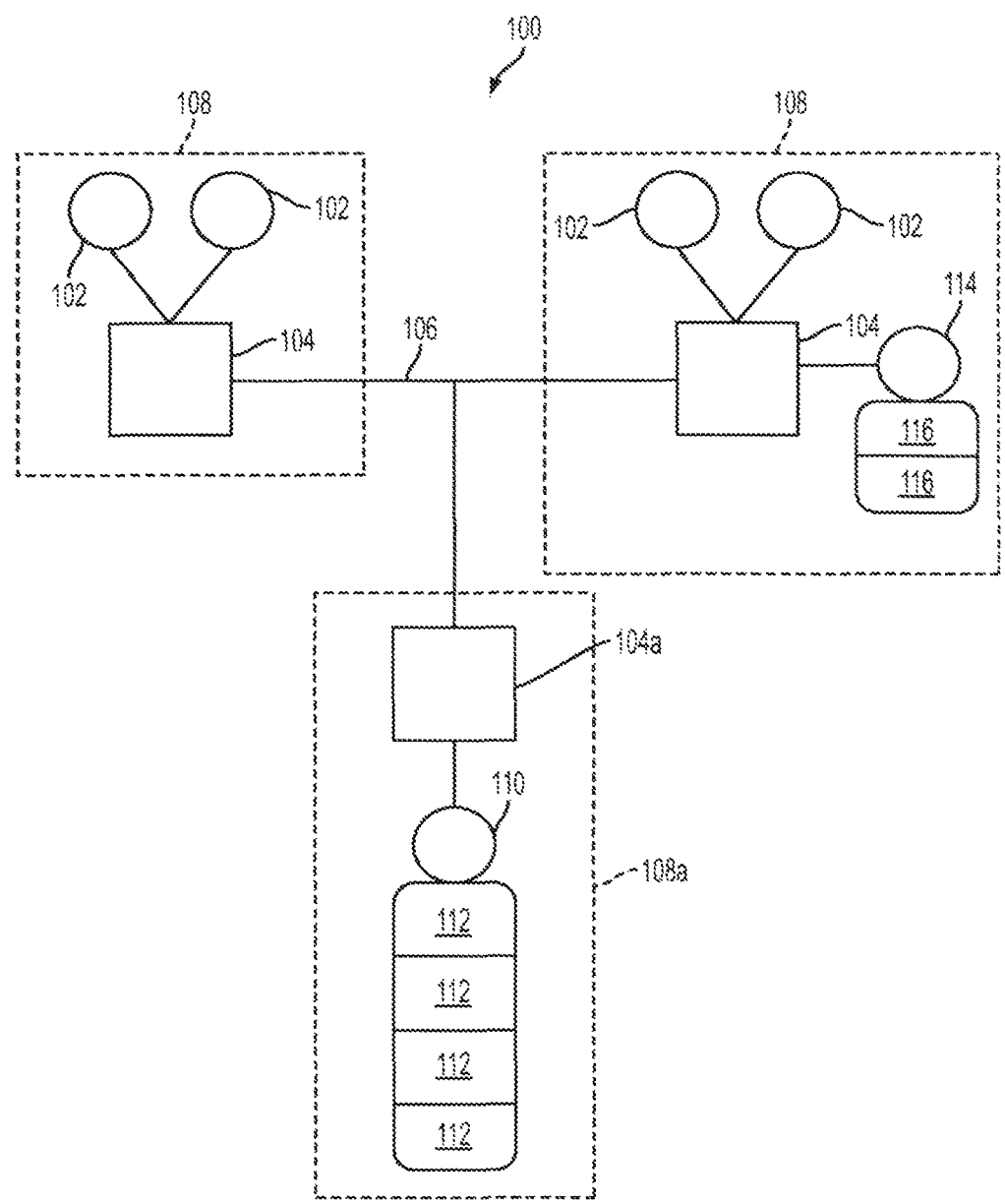
FIG. 1 is a diagram illustrating an example collaborative communication system configured in accordance with one embodiment of the invention.

While specific embodiments are discussed below, it should be understood that this is done for illustration purposes only and that other components and configurations can be used in accordance with the systems and methods described herein. For example, while the descriptions below are centered around implementations of a collaborative communication system used to facilitate communications between remote participants in a manner similar to a face-to-face meeting, it should be understood that the systems and methods described herein can be extended to any application involving communication and coordination between multiple, distributed computers and services.

In certain embodiments, there can be several roles for participants in a collaboration session and participants can change or exchange roles as the session progresses. One role can be that of a moderator or chair of the collaboration session. A moderator can, for example, initiate and/or control the collaboration session. Not all collaboration sessions, however, explicitly require a designated moderator. Another role can be that of a presenter or speaker. A participant who has assumed a presenter role can, for example, have the ability to make presentations, in any of the available media formats, to the other participants in the current collaboration session. Another role can be that of a viewer. A participant who is in a viewing role can, for example, has the ability to view and hear the presentations made by whichever participant is presenting at that time. Further, each collaboration session can include one or more participants in any number of these roles.

Collaboration sessions can provide a convenient means of allowing individuals from various geographic locations to conduct a meeting through, e.g., a multimedia collaboration session comprising sharing of presentations, discussions, media, such as voice and video, and documents, such as text, drawings and slides, using common desktop devices such as personal computers and telephones. Participants in a collaboration session can share and collaborate in the preparation of documents stored on a particular participant's device, such as a computer, because the device can be the same device as, or networked to, the device used in the collaboration session.

A collaboration session can include various types of media components, depending on a particular implementation. Some examples of such media component types include presentation slides, video files, audio files, electronic documents, drawings, and instant messages.

The term "collaboration session" is meant to include any meeting in which several people or parties can communicate using data sent via connections established using shared electronic networks. Such a meeting can also be referred to by various terms, including a conference, a multimedia conference, a conference session, a multimedia collaboration session, and a multiparty conference session. In one embodiment, the data in a session can, for example, include audio data. In another embodiment, the data in a session can, for example, include both audio and video data. In yet another embodiment, the data in a session can, for example, include audio, shared desktop applications, and shared drawings on a networked whiteboard. Many other types of data, however, can also be included.

FIG. 1 is a diagram illustrating an example embodiment of a collaborative communication system 100 configured in accordance with the systems and methods described herein. As can be seen, system 100 comprises a plurality of endpoints 102, media switches 104, and at least one network communication link 106. A collaboration session implemented using system 100 can comprise a collection of communicating endpoints 102. An endpoint 102 can, for example, comprise a computer system of a participant or a system providing a service for the session. Endpoints 102 communicate by connecting to one of a plurality media switches 104, which are interconnected to one another via a network communication link 106. The session so formed can then relay control messages and media stream messages from one endpoint 102 to another. Endpoints 102 can be associated with one or more domains 108. One or more media switches 104 can then serve each domain 108. A media switch 104 can also be referred to by other terms such as relay server, message router, or software router.

Endpoints 102 are typically associated with either human session participants or with services required by session participants. Examples of endpoints 102 can, for example, also include software applications executing on desktop computers of session participants. These software applications can be configured to perform tasks such as capturing and rendering media, e.g., text messages or video. Another example of an endpoint 102 can be a telephone. Endpoints 102 can also be services required for operation of a collaboration session, such as a service configured to maintain presence state, locating endpoints, or mixing audio streams.

The total number of domains 108 can be one or many, but in the embodiments described below each endpoint 102 is assigned to exactly one domain 108. Domains 108 can be configured to route messages within system 100 using media switches 104. Typically the domain for a specific endpoint 102 is chosen based on some relevant attribute, such as company affiliation or geographical location. In one embodiment, for example, domain assignment and naming corresponds to the domain name system used for naming computers on the Internet. Each domain name should be unique, i.e., the name assigned to a domain 108 should be assigned to only one domain 108 in collaborative communication system 100.

Each endpoint 102 can also be assigned an address that is unique, i.e., each endpoint address can be assigned to only one endpoint 102 in collaborative communication system 100. But in certain embodiments, endpoints 102 can be assigned multiple addresses or aliases. In one embodiment, for example, the endpoint address is derived by adding another identifier to the domain name of the domain to which the endpoint belongs. Each endpoint address should, however, be unique. Endpoints can, depending on the embodiment, specify additional 'location' information to make their address unique. Thus, "joescomputer@raindance.com" and "joescomputer/work@raindance.com" can be unique endpoints that both reference entity "joescomputer@raindance.com."

In most embodiments, telephone numbers are not endpoints; however, artificial endpoints that refer to phone-only participants can be created to allow the systems and methods described herein to accommodate such phone only participants.

One of the domains illustrated in FIG. 1 can, for example, include collaboration session service 110, configured to make various collaboration session features 112 available to endpoints 102 through media switch 108a. Endpoints 102 can, for example, use the collaboration session features 112 to engage in a collaboration session. Thus, as described below, collaboration session service 110 can be a conference service and services 112 can be various conference features that allow endpoints 102 to exchange and share, e.g., audio, video, and other applications. As with conventional central server applications, therefore, endpoints 102 can communicate with collaboration session service 110 in order to access the collaboration session features 112 needed to engage in a collaboration session.

As can be seen, however, one or more of domains 108 can also include a feature service 114 that can be configured to make certain features 116 available to endpoints 102, including, e.g., collaboration session features such as features 112. Thus, the features needed to engage in a collaboration session, e.g., a collaborative conference session, can be distributed throughout system 100. This can, for example, improve the performance of certain features by reducing the bandwidth demands on link 106 and eliminate latency and timing issues associated with link 106.

Thus, in a collaborative communication system 100, configured in accordance with the systems and methods described herein, resources can be distributed based on the needs and preferences associated with various domains 108. The distributed resources can then be accessed by endpoints 102, as can the resources associated with a central domain, e.g., domain 108a, as required by a particular collaboration session.

Before describing some exemplary implementations comprising distributed resources according to the systems and methods described herein, various example methods whereby endpoints 102 can communicate with each other via media switches 104 are described FIG. 2 illustrates four possible scenarios for communication between two endpoints 201 and 204, which can be similar to endpoints 102, via media switches, e.g., media switches 104. In FIG. 2A, for example, source endpoint 201 and destination endpoint 204 are both in the same domain 230 and served by media switch 203. Thus, a message can be sent from endpoint 201 via communication link 202 to media switch 203, which can be configured to read a destination address associated with the message and route the message via communication link 205 to endpoint 204.

Figure 2A:
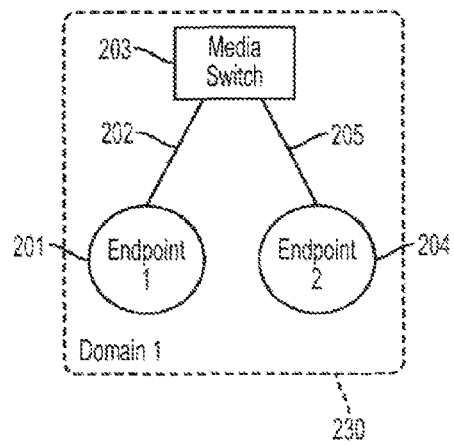
FIG. 2A is a diagram illustrating the communication of messages within a collaborative communication system where, only one media switch is involved in accordance with one embodiment of the invention.
Figure 2B:
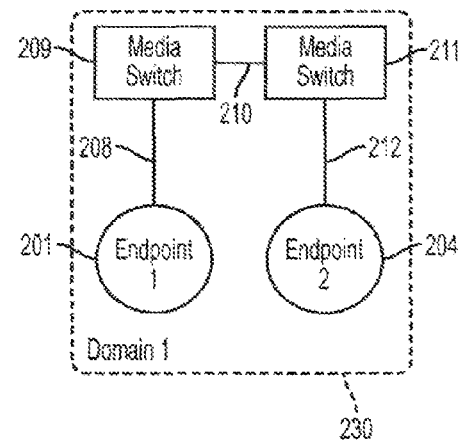
FIG. 2B is a diagram illustrating the communication of messages within a collaborative communication system where two media switches are involved in accordance with one embodiment of the invention.

In the example of FIG. 2B, on the other hand, source endpoint 201 and destination endpoint 204 are both in the same domain 230, but served by different media switches 209 and 211, respectively. Accordingly, a message transfer from endpoint 201 to endpoint 204, necessarily involves two media switches. Source endpoint 201 can send a message via communication link 208 to media switch 209. Media switch 209 can be configured to recognize that the message destination is not an endpoint to which it is directly attached. In such cases, media switch 209 can be configured to locate destination endpoint 204 and determine that it is attached to media switch 211. Media switch 209 can be configured to then send the message to media switch 211 via communication link 210. Media switch 211 can be configured to then relay the message to endpoint 204 via communication link 212.

Figure 2C:
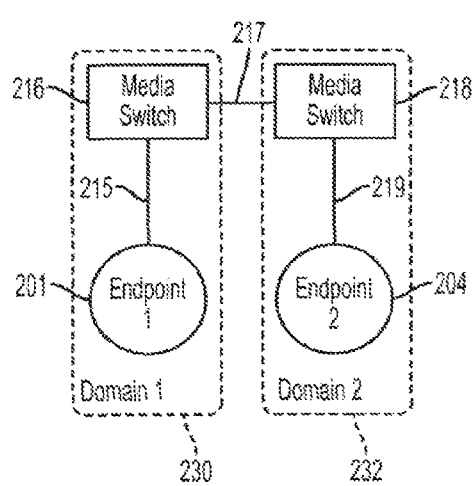
FIG. 2C is a diagram illustrating the communication of messages within a collaborative communication system where two media switches and two domains are involved in accordance with one embodiment of the invention.
Figure 2D:
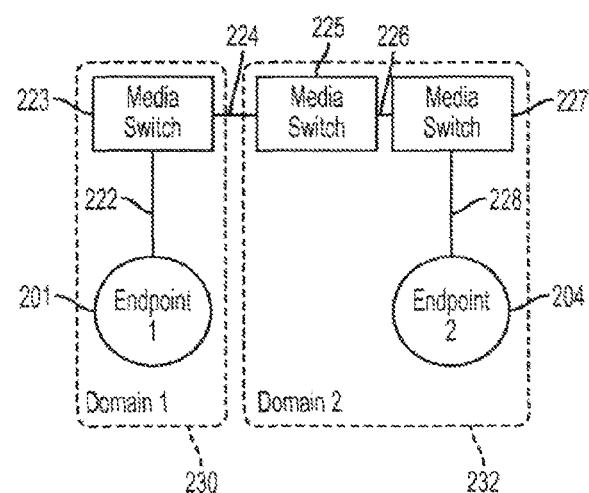
FIG. 2D is a diagram illustrating the communication of messages within a collaborative communication system where three media switches are involved in accordance with one embodiment of the invention.

In FIGS. 2C and 2D, endpoints 201 and 204 are in different domains 230 and 232, respectively. Again, therefore, at least two media switches 216 and 218 can be involved in communication between endpoints 201 and 204. In FIG. 2C, for example, source endpoint 201 can send a message to media switch 216 via communication link 215. Media switch 216 can be configured to read the address of the destination and determine that it is associated with a different domain 232. Media switch 216 can be configured to then relay the message to media switch 218 via communication link 217. Media switch 218 can be configured to examine the destination address and recognize that it is associated with endpoint 204. Media switch 218 can be configured to then forward the message to destination endpoint 204, via communication link 219.

The example of FIG. 2D also illustrates a case where source endpoint 201 and destination endpoint 204 are in different domains 230 and 232 respectively. Here, however, destination domain 232 is served by multiple media switches 225 and 227. Accordingly, a message can arrive at a media switch, e.g., media switch 225, other than the one to which destination endpoint 204 is connected, e.g., media switch 227. As with the example of FIG. 2C, media switch 223 can, in such situations, be configured to receive a message from source endpoint 201, via communication link 222. Media switch 223 can be configured to examine the message destination address and recognize that the message must be forwarded to domain 232.

But domain 232 is served by two media switches. Moreover, in certain embodiments, media switch 223 cannot determine which media switch is serving destination endpoint 204. In such an embodiment, media switch 223 can be configured to forward the message to any media switch serving domain 232. For example, if the message is forwarded to media switch 225, via communication link 224, then media switch 225 can be configured to receive the message and determine the associated destination address, which should not match any endpoint connected to media switch 225; however, all media switches in the domain 232, e.g. media switches 225 and 227, should be aware of all media switch/endpoint pairings in domain 232 and thus can recognize that destination endpoint 204 can be reached through media switch 227. Accordingly, media switch 225 can be configured to relay the message via communication link 226 to media switch 227, which can be configured to then complete the message delivery by forwarding the message to endpoint 204 via communication link 228.

Figure 4A:
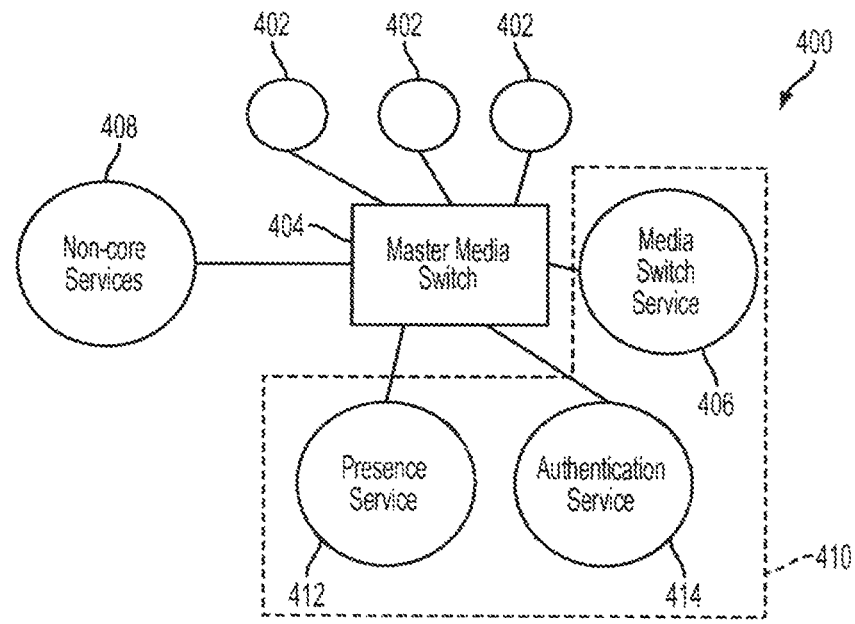
FIG. 4A is a diagram illustrating an example embodiment of a domain that can be included in the system of FIG. 1.

Thus, it can be seen that a message can travel through three media switches in the delivery process from any source endpoint to any destination endpoint. Preferably, due to the configuration of media switches and domains in accordance with the systems and methods described herein, a message will travel through no more than three media switches. This can, for example, reduce latency and improve communication efficiency. Because multiple media switches serving the same domain should be aware of all media switch/endpoint pairings, an endpoint locator can be included in such domains as described in more detail below, beginning with FIG. 4. moreover, although only a single message transfer between two endpoints is described above, it can be appreciated that the systems and methods described herein apply equally to multiple messages in sessions involving many endpoints, media switches, and domains, because all communications are essentially a message transfer from a source to a destination endpoint.

Thus, using the communication techniques described in relation to FIGS. 2A-2D, for example, a collaborative communication system can be implemented in which endpoints 102 can communicate with each other through a mesh of media switches 104 and in which distributed resources can be made available via the mesh. Accordingly, an endpoint can be located anywhere that it can be reached by a network communication link. Further, any component or service needed for a collaborative communication session can be located anyplace in the system. Further, these components or services can be distributed throughout the network as needed to balance conflicting requirements for performance, cost, security, and resource usage.

In order to distribute resources, various considerations must be addressed to ensure access and coordination between endpoints, media switches, resources, and/or domains. In this regard, FIG. 4B is a diagram illustrating a domain 400 configured in accordance with the systems and methods described herein. Thus, domain 400 includes a media switch 404 configured to allow endpoints 402 to communicate with endpoint in other domains, or with each other, as described in relation to FIG. 2A-2D. Domain 400 also includes various core services 410, which allow endpoints 402 to engage in collaborative communication sessions with other endpoints. Domain 400 can also comprise a media switch service 406 configured to enable media switch 404 to act as an addressable endpoint. This can, for example, allow an administrator to access and administer media switch 404. In certain embodiments, core services 410 are the minimum set of services that must be located at a domain 400, and they collectively define the communication infrastructure used by a broader collaborative communication system, such as system 300 illustrated in FIG. 3. Other services, e.g., non-core services 408, attach to this infrastructure as addressable endpoints and, therefore, non-core services 408 can be accessed from any domain, as long as the endpoint address is known. Media switch 404 can be configured to shuttle messages between all endpoints 402 and other endpoints external to domain 400. The term endpoint can be used to refer to client applications, application level services, and system level services as well as to client device used to access media switch 404. Media switch 404 can, in certain embodiments, comprise essentially a software "message router," and can be configured to act much the same as a hardware router, except at a higher level. For example, a hardware router forwards, e.g., TCP/IP packets, possibly through several routers, to a destination Internet Protocol (IP) address, where the packets are re-assembled into messages. In a similar manner, endpoints 402 can be configured to break messages up into frames and send the frames to media switch 404. Media switch 404 can, in turn, be configured to forward the frames to a destination endpoint address, e.g., an address that acts in a similar manner as an email address, where they are re-assembled into messages. In the same way that TCP/IP packets can pass through several hardware routers on the way to their final destination, messages routed by media switch 404 can pass through several media switches between a source endpoint 402 and destination endpoint. As explained above, however, a message routed by media switch 404 should pass through at most 3 media switches. The ability for media switch 404 to connect to other media switches creates a media switch mesh that expands the reach of endpoint 402 communications. Any endpoint 402 that connects to the mesh can communicate with any other endpoint that is attached to some other media switch in the mesh.

Media switch 404 can be configured to service one or more domains 400. If media switch 404 is to forward a message to an endpoint in a domain it does not service, it can be configured to find the address of the media switch for the remote domain. In one embodiment, the address of the media switch for the remote domain is found by performing a lookup, e.g., using the Domain Name Service (DNS). Media switch 404 can then be configured to forward the message to the remote media switch, which forwards it to the destination endpoint.

All endpoints 402 can be configured to maintain a virtual persistent connection to media switch 404. Since there is often a physical limit to the number of concurrent connections that media switch 404 can handle, multiple media switches can be allowed to service a single domain 400. This allows a collaborative communication system, i.e., system 300, to scale by simply adding additional hardware and/or media switch processes.

A main function of media switch 404 is to route messages. Message routing requires little or no application logic or application state. As a result, media switch 404 can operate without maintaining significant state information. Therefore, if media switch 404 crashes, is disconnected, or becomes otherwise unavailable, all endpoints 402 attached to media switch 404 can attach to another media switch servicing the same domain 400 and continue to function normally. The only effect would be that for a short amount of time, endpoints 402 can appear to be "unrouteable," i.e., not connected.

With multiple media switches servicing the same domain 400, it is possible that messages targeted to domain 400 can arrive at a media switch other than the one to which the destination endpoint 402 is connected. As described above, the message must be forwarded to the correct media switch and then to the destination endpoint 402. Therefore, every media switch needs to know to which media switch every endpoint 402 in domain 400 is connected. Thus, some form of endpoint locator function is required. Generally, an endpoint locator function, tracks media switch/endpoint pairings and makes the information available to all media switches serving a particular domain.

In one embodiment, a master media switch can provide the endpoint locator function. A master media switch can, therefore, be a media switch that is configured to provide endpoint location information to other media switches and endpoints. Thus, a master media switch should be running before any other media switches, or any other services, are brought online. When, for example, media switch 404 is started, it can then be configured to first register with a master media switch. The master media switch can be configured to respond by passing media switch 404 information related to all routes to endpoints 402 from all media switches it knows about.

Furthermore, whenever an endpoint 402 connects or disconnects from, e.g., media switch 404, media switch 404 can be configured to inform the master media switch, which can in turn be configured to pass the information on to all media switches with which it is connected. This can, for example, ensure that all media switches know the location of all endpoints 402 currently connected in domain 400. If, for example, media switch 404 crashes, or network connectivity to the master media switch is lost, then master media switch can be configured to recognize the change and inform all other media switches to remove all of the routes to endpoints 402 associated with failed media switch 404.

In another embodiment, all media switches within, e.g., domain 400 can be configured to register with a master media switch as described above; however, the master media switch can be configured to simply return a list of all media switches that are currently registered. A new media switch can then directly connect to each of the registered media switches and retrieve endpoint route information directly from each media switch, rather than querying the master media switch for the information. Furthermore, when endpoints 402 connect or disconnect from a media switch 404, media switch 404 can be configured to inform all of the other media switches directly, rather than informing the master media switch, which in turn informs all other media switches. Further, if a media switch 404 becomes unavailable, e.g. crashes or disconnects from the network, all media switches can be configured to independently notice the loss of their connection with the unavailable switch, rather than being informed by the master media switch.

In another embodiment, as illustrated in FIG. 4B, an endpoint locator service 416 can be configured to provide the endpoint locator functionality. Thus, endpoint locator service 416 should be running before any media switches, or any other services, are brought on-line. When, for example, media switch 404 is started, it can be configured to first register with endpoint locator service 416. Endpoint locator service 416 can then be configured to respond by passing media switch 404 information related to all routes extending to endpoints 402 from all media switches it knows about. Furthermore, whenever an endpoint 402 connects or disconnects from, e.g., media switch 404, media switch 404 can be configured to inform endpoint locator service 416, which can in turn be configured to pass the information on to all media switches with which it is connected. Again, for example, this can ensure that all media switches know the location of all endpoints 402 currently connected in domain 400. And if, for example, media switch 404 crashes, or network connectivity to endpoint locator 416 is lost, then endpoint locator 416 can be configured to recognize the change and inform all other media switches to remove all of the routes to endpoints 402 associated with failed media switch 404.

Further, to prevent endpoint location information from being a single point of failure, one or more backup endpoint locators, or master media switches, can also be included in domain 400 and can be brought on-line in the event of such a failure. Media switch 404, for example, can be configured to share endpoint addresses with a backup endpoint locator, or a backup master media switch, in case of a failure of a primary endpoint locator service 416, or a primary master media switch, or at least the endpoint locator functionality that it provides.

Media switch 404 can be a message delivery module that knows nothing about the application/service objects that connect to it. But there are many instances where it can be beneficial for media switch 404 to interact with other services, such as presence service 412 or authentication service 414. It can also be desirable to administer to media switch 404 in the same manner that other services in domain 400 are administered. To accomplish the latter, media switch 404 can be configured to create an internal object known as a media switch service 406, which can be configured to act as an addressable endpoint for media switch 404. Thus, media switch service 406 allows media switch 404 to interact with other application layer services, and allows other services and administrative applications to interact with media switch 404.

Presence service 412 can be configured to maintain information on all endpoints 402 that are connected within a domain 400. Endpoints 402 can, therefore, be configured to publish their presence with presence service 412, or to subscribe to presence information related to other endpoints 402. When an endpoint's presence state changes, presence service 412 can be configured to inform all endpoints 402 that had subscribed to that endpoint's presence. Presence information can, depending on the embodiment, be stored as an arbitrary set of attributes that are defined by the endpoint that publishes the presence.

Presence service 412 can also be configured to provide more complex logic to allow other endpoints 402 to locate and optionally reserve the use of other services. For example, when an endpoint wishes to join a specific conference, or a collaborative communication session, it locates the conference if it already exists. If it doesn't exist yet, then the conference is created on an available conference service, a process which is described below. Multiple endpoints can be performing this action simultaneously, creating a potential race-condition. In one embodiment, presence service 412 resolves the race by synchronizing 'locate and reserve' messages sent by endpoints 402. Thus, if a locate message fails to locate a specific conference, and results in a reserve message to reserve the conference service, then all subsequent requests to locate the specific conference succeed, and are routed to the same conference service. This functionality can also be used to resolve this race condition for any similar situation with any type of service available to endpoints 402.

In one embodiment, there can be five distinct types of information that presence service 412 is configured to maintain for endpoints 402; however, since the information is maintained as a set of arbitrary attributes, presence service 412 can be configured to handle other types of information if desired.

The first type of information can be presence state. Thus, presence service 412 can be configured to attach to endpoint locator service 416, or to a master media switch, so that it is informed of every endpoint 402 that is interfaced with media switch 404. Presence service 412 can be configured to then create presence entries for these endpoints 402. Such automatically generated presence entries can be referred to as auto-presence or administrative presence, and allow other services to be aware of all endpoints 402 in a collaborative system. Any service that wants to know if an endpoint 402 disconnects, can be configured to subscribe to the endpoints' presence to track the associated presence state. For example, a conference endpoint will subscribe to the presence state of each participant endpoint that joins the conference. If any participant leaves the conference, presence service 412 can be configured to let the conference endpoint know, so it can remove the endpoint from its participant list.

If an endpoint 402 wishes, it can explicitly publish its presence. This is similar, for example, to presence used in Instant Messaging (IM) systems, and it is intended to indicate the on-line state of a user's endpoint, e.g., on-line, away from my desk, off-line, etc. This type of presence information is useful for always-connected applications or services so that an endpoint 402 can be notified when the state of one of their on-line contacts changes.

Another type of information that can be maintained is entity availability. For example, when any non-core service 408 starts up, it can be configured to publish its presence with presence service 412. In addition, entity availability can be registered with presence service 412 at the same time. Entity availability can be used to indicate a service instance's ability to accept new connections, for example based on current workload. For example, predetermined entity availability values of green, yellow, or red can be used to indicate whether the service is available for use, i.e., lightly loaded; is experiencing moderate workload, or is unavailable for use due to heavy workload, respectively. Other embodiments, of course, can use other types of indicators and other criteria for availability.

If any application, service, or endpoint wants to use a service of a given type, it can send a message to presence service 412 to request an available service of that type, and presence service 412 can be configured to select an instance of the requested service type and return an endpoint address associated with the selected instance of the requested service type. The application can then begin communicating with the selected service instance. As a service instance's load changes, it can update its entity availability information, which can change the presence service's response to requests for an available service. This can, for example, provide an automatic load balancing for services, since selection of a service instance in response to a request for an available service can be based on entity availability value, which is a component of presence state. Setting entity availability value can further provide the capability to bring services on line and off line gradually and gracefully as needed.

Thus, when a service starts it can be configured to register its presence, which will result in the service subsequently being included in the service selection process. Additionally, to take a service off line, the service can change its entity availability state to, e.g., red, and it will no longer be selected for use. As soon as the existing connections are detached, the service can be stopped.

Another type of information that can be maintained by presence service 412 is entity type. Thus, each endpoint 402 that advertises its availability state can also specify its entity type, which can be used by other services to locate available endpoints of a given type. For instance, a conference service can request the location of a conference logging service to which it can be configured to send all conference events. The conference service can thus be configured to send a lookup command to presence service 412, specifying that it needs to locate an endpoint of type conference logging service, e.g., of entity availability state green, or if no green service is available, then, e.g., state yellow.

Presence service 412 can also be configured to maintain an endpoint address, e.g., Internet IP Address, for endpoints 402. This information can, for example, be useful from an administrative perspective.

Presence service 412 can also be configured to maintain extended attribute information for endpoints 402. For example, endpoints 402 can be configured to specify an arbitrary list of key-value pairs in their presence state's extended attributes. These key-value pairs can, for example, be searched on just as entity type and availability can be searched on. This allows new types of endpoints 402 and new functionality, e.g., non-core service 408, to be added to the system without modifying presence service 412.

When any endpoint 402 connects to media switch 404, media switch 404 can be configured to determine if the endpoint 402 must be authenticated. Often, endpoints that do not require authentication have very little permission in the system, other than the ability, for example, to join conferences. Other endpoints 402, such as conference moderators, or services, should be authenticated. Endpoints 402 are typically provisioned at their home domain, so media switch 404 can be configured to send an encrypted message to an authentication service 414 associated with the appropriate domain to authenticate an endpoint 402. Authentication service 414 can comprise a standard programmatic interface (API) for establishing an authentication protocol. For example, depending on the implementation, an authentication service 414 can access a database, an LDAP server, or any other back-office system to authenticate an endpoint 402. Thus, each domain 400 can create a custom implementation of authentication service 414 service to allow the use of existing databases.

Figure 3:
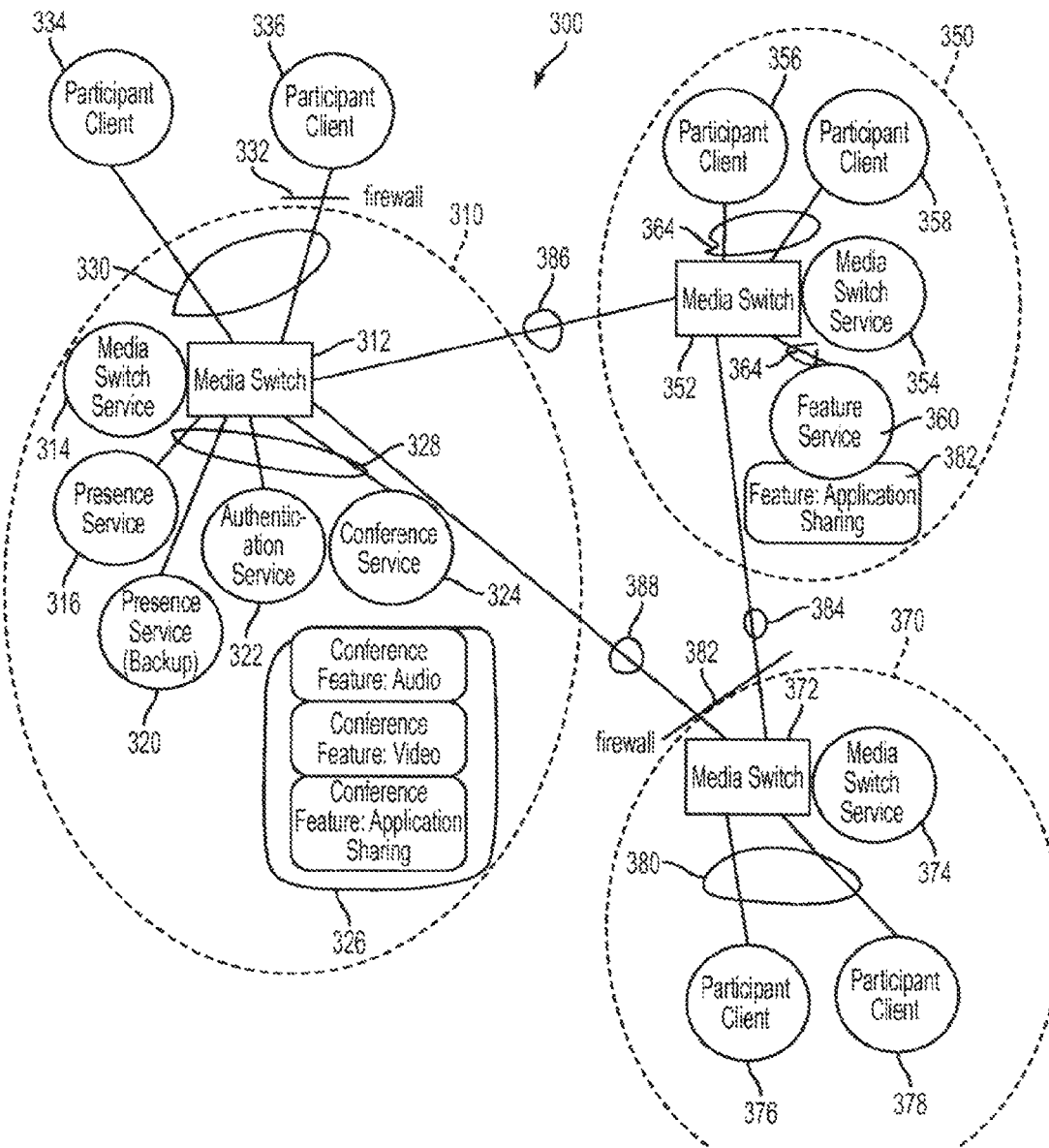
FIG. 3 is a schematic view of an embodiment of a conferencing system according to the present invention.
Figure 4B:
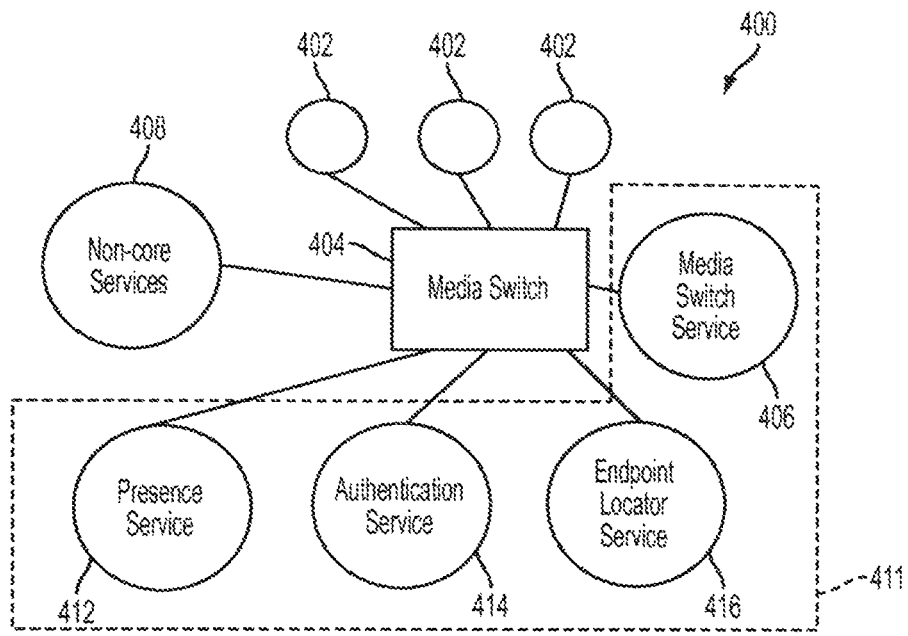
FIG. 4B is a diagram illustrating another example embodiment of the domain of FIG. 4A that includes an endpoint locator.

Now an exemplary embodiment of a collaborative communication system 300 configured to enable collaborative conferences in accordance with one embodiment of the systems and methods described herein is illustrated in FIG. 3. In the embodiment of FIG. 3, the system 300 includes a first domain 350, a second domain 370, and a domain 310 associated with a central service provider, i.e., a provider of collaborative communication services. Domain 350 can be any domain, as can domain 370, but in the example of FIG. 3, domain 350 and 370 are different domains.

System 300 also includes two clients 334 and 336, which can be associated with domains that do not have a dedicated media switch. Thus, clients 334 and 336 can be configured to communicate using the service provider's media switch 312. In alternative embodiments, any number of other domains can be added in communication with the service provider's domain 310.

Domain 310 comprises a complete set of features and services that can be accessed by all participant clients 334, 336, 356, 358, 376, and 378 via media switches 312, 352, and 372. Thus, media switch 312 is attached to six endpoints, each associated with a service or feature. Communication links 328 are used to communicate conference messages between media switch 312 and the services. The services available via domain 310 can include core services, e.g., media switch service 314, presence service 316, and authentication service 322, as well as non-core services, some of which are described below. In addition, some services can be distributed throughout system 300, as described in detail below. Note that, in certain embodiments, the core services are required for all domains, which have a media switch, but core services are not shown explicitly in FIG. 3 for domains 350 and 370.

Domain 370 is an example of a domain that comprises a dedicated media switch 372. Media switch 372 can comprise a media switch service 374 and can be configured to serve participant client endpoints 376 and 378. In the embodiment illustrated in FIG. 3, domain 370 includes a firewall 382 that filters traffic between media switches on links 384 and 388. Firewall 382 can, for example, be any conventional firewall. Various techniques can then be used to pass messages through firewall 382, including HTTP tunneling, encryption, and opening dedicated ports.

Domain 350 can also comprise a dedicated media switch 352 with an associated media switch service 354. Media switch 350 can be configured to service participant client endpoints 356 and 358 and can also include a feature service 360 that can be configured to provide a local application sharing feature 362. Feature service 360 can be used for several reasons. For example, one reason to include a feature service 360 can be to provide participant client endpoints 356 and 358 better application sharing performance than that provided by conference provider application sharing feature 326. For example, network performance of communication link 364 can be better than the performance provided by external communication link 386. Thus, if participants 356 and 358 require better application sharing performance, local application sharing feature 362 can be located within domain 350 and accessed via feature service 360.

Further, external link 386 can be expensive to use, and it can also be desirable to minimize traffic across external link 386, which also makes distributing application sharing capability more desirable. In addition to cost, it can also be desirable to limit traffic on external communication link 386 because it is used by other unrelated traffic such as transferring data for email and web pages. Thus, it can be desirable to minimize network usage by collaborative communication system the use of external link 386 in order to free bandwidth for these other functions. Yet another reason for having a local feature service 360, as in this embodiment, is to enhance security, for example, if the application sharing content between participants 356 and 358 is especially sensitive. Most application sharing traffic is between clients 356 and 358 anyway, making local distribution of file application sharing sensible.

Similarly, other services can be located locally to a domain in order to provide access to certain data available only in the local domain. For example, an authentication service might be best located in a company's domain if it is to access information from a local database, e.g., of employees, such as a company phonebook server or LDAP server.

It can be appreciated that these illustrations of service distribution are only representative of an almost infinite number of possible combinations. These combinations can be chosen to meet the needs of each implementation and typically will represent some trade off between cost, performance, security, and bandwidth usage; however, each implementation will have various needs, various resources, and usage patterns. For example, a customer A may desire a low-cost solution and use all services provided off domain by a service provider associated with domain 310. A customer B, on the other hand, may require many internally connected clients to use video interaction and opt to have a local video feature server to minimize video traffic on its external Internet connection, but use external services for other media types. A customer C may be sensitive to security concerns and so opt to have all services hosted internally. A customer D may opt to start using multimedia collaboration cautiously with all services hosted externally, then gradually deploy services in their domain as usage and acceptance increases. These examples all serve to illustrate the variety of configurations possible using the architecture of the present invention.

Thus, for example, when determining how to distribute, or even whether to distribute, certain resources within system 300, the needs of a particular domain must be considered. Often, a particular domain will be associated with specific division or company, so the needs of that division or company can be considered and the appropriate trade-offs made as described above. But the systems and methods described above provide the flexibility to distribute resources as required. In other words, the mesh of media switches 312, 352, and 372 can be configured to enable improved resource sharing leading to improved collaborative applications.

Non-core services distributed within system 300 should be configured to connect to a media switch, but are not required for operation of a domain. An example of non-core service is conference service 324 and feature service 360. Another example is a conference logging service 390. Thus, conference service 324 and feature service 360 can be configured to provide endpoints for clients to access, through an appropriate media switch, or media switches, various media features needed to form a given collaborative communication session. Such media features can include media types such as audio, video, slides, or application sharing.

Conference service 324, with associated features 326, and feature service 360, with associated feature 362, can be used to allow various participant clients to engage in a collaborative conference session within system 300. Clients 356 and 358 are exemplary of clients that belong to the company that owns domain 350. In one example, employees who are participating in an internal meeting can, for example, use clients 356 and 358. Alternatively, clients 356 and 358 can be part of a conference session across multiple domains. Similarly, internal members of a project team or employees of the company that owns domain 370 can use clients 376 and 378.

In the example of FIG. 3, participant clients 334 and 336 are not associated with domains 310, 350, or 370. Since all participant clients should be connected to a media switch, these endpoints establish a connection with a media switch in another domain. In this case, the service provider's media switch 312. Participant clients 334 and 336 can, for example, be associated with a small entity or an entity that desires to avoid the expense of a local media switch and is willing to accept the possibility of decreased performance when using a shared media switch, such as media switch 312.

Thus, unlike a client-server architecture, peer-to-peer architecture, or other distributed computing architecture, system 300 can comprise an interconnected mesh of media switches that act as message routers. End participant client and application services connect to a specific media switch as a unique and addressable endpoint. Once connected, endpoints can send messages to any endpoint that is connected to this mesh.

It should be noted that while the architecture illustrated in FIG. 3 is not strictly a client-server architecture, peer-to-peer architecture, or other distributed computing architecture, it can be made to simulate any or all of these architectures, even within the same collaborative session. Since all clients and services are endpoints, and since any endpoint can send a message to any other endpoint, a client can send a message to a service, e.g., as in a client-server architecture, a client can send a message to another client without involving an intermediate service other than the Media Switch, e.g., as in a peer-to-peer architecture, or a service can send a message to another service, e.g., as in a distributed computing architecture.

For example, in an illustrative embodiment, a conference, a participant client can issue a conference control message to conference service 324, e.g. a message intended to lock the conference, and within the same session, send video data directly to the other participant clients that have asked to view the video data, without going through conference service 324. Further, conference service 324 can send a message to an audio conference feature running in a remote feature service 360.

Further, media switches as well as application services can be distributed in any configuration desired, either within local area networks (LAN's) or across a broader network, such as the Internet. This ability allows an organization to host some or all component services on a local network, e.g., inside their firewall, and to provide better security or enhanced performance for bandwidth intensive services. For example, if an organization hosted a media switch 352 and an application sharing service feature 362 on their LAN, all application sharing traffic between, e.g., participants 356 and 358 within the organization, would travel on the LAN. Since LAN's often provide much higher bandwidth and lower latency than long interconnections, application sharing performance within the organization can, therefore, be improved.

It should be noted that other conference data and messages would travel between the LAN and external media switches and services, however, since this is low bandwidth and less time critical data, the performance would be acceptable. Such a configuration can also allow application service providers to host custom services, such as audio conference control, and provide access to these services to third parties.

Further, message aggregation can also be provided. Thus, if a message is addressed to multiple destination endpoints, then the sending media switch can be configured to determine if any of the destination endpoints for a specific message are connected to a common destination media switch. The sending media switch can be configured to then forward a single copy of the message to the common destination media switch with all of the destination endpoint addresses in a recipient endpoint address list. This strategy reduces both the outgoing and incoming bandwidth used for all media switches and also distributes the load of duplicating and forwarding messages across media switches, e.g., in system 300.

Features that provide redundancy and increased reliability can also be provided. For example, the distribution of services and features alone provides some protection in that the effect of a localized failure is minimized. In addition, certain critical services can be provided with backups. In system 300, for example, primary presence service 316 is backed-up by a redundant presence service 320 that can take over in the event of failure of the primary service. In another embodiment, a primary service, e.g., presence service 316 can be located locally to a domain, with backup provided by a server in another domain, such as domain 310.

Services and features can also be provided in multiple instances throughout system 300 to increase load handling capacity and balancing. For example, multiple media switches can serve as endpoints in a domain to increase performance for a number of connected endpoints.

Media switches can also be designed to minimize the effect of failure, because media switches can be configured to maintain as little state information as possible. This way, the effect of any single media switch failure is limited to a temporary loss of connection for messages from, and to, endpoints connected to the failed media switch. If an endpoint determines that the media switch to which it is connected has failed, the endpoint can be configured to reconnect to any available media switch and once again become available for message traffic.

It should also be appreciated that the service, features, and media switches comprising system 300 can essentially comprise software applications, and as such may be deployed in a wide variety of configurations on actual computing hardware. For example, in FIG. 3 communication links 328 between services 316, 318, 320, 322, and 324 and media switch 312 are shown. In actual implementation, these links 328 can simply be inter-process communication paths between applications on a single hardware server, or links 328 can be network links between several servers, or some combination thereof. Accordingly, the system architecture associated with collaborative communication system 300, for example, can be highly configurable. For example, system 300 can, be configured to run all services and features in a single process or as a collection of distributed processes.

Figure 5:
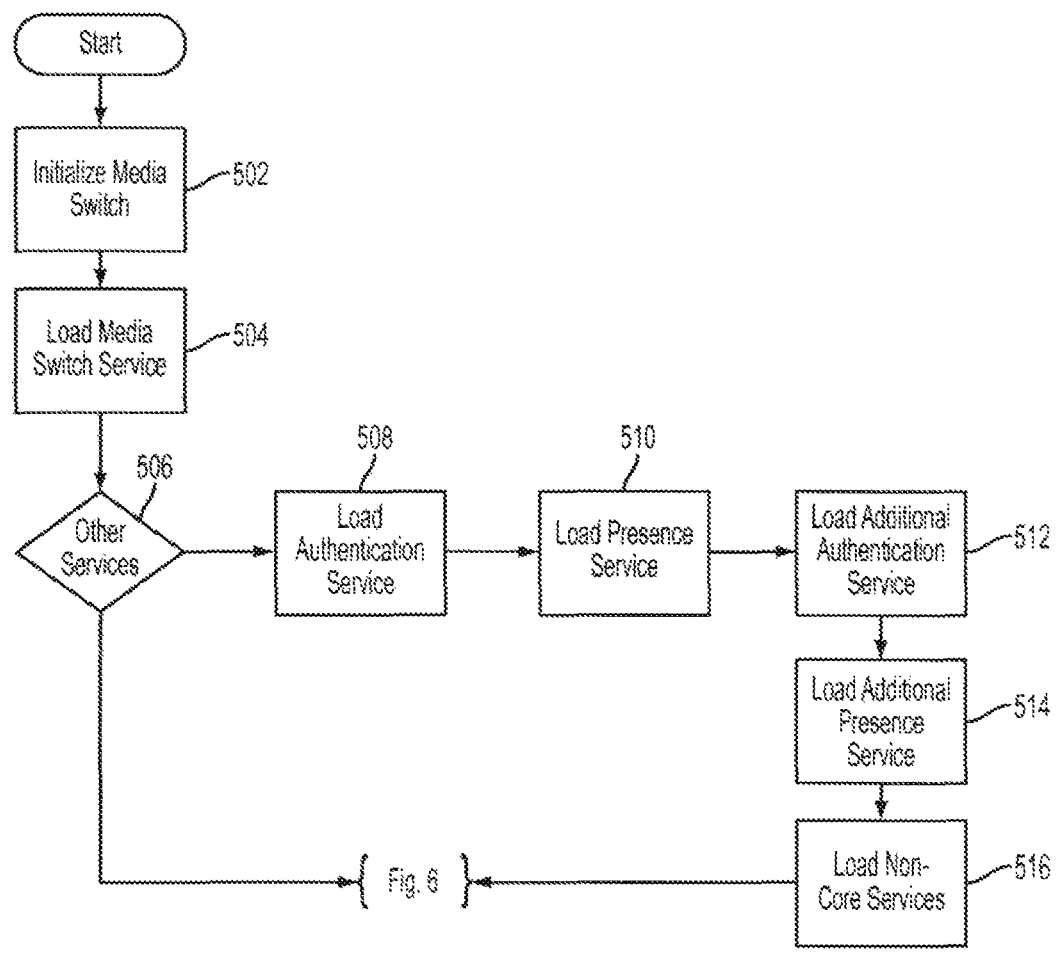
FIG. 5 is a flow chart illustrating an example method for initializing a collaborative communication system in accordance with one embodiment of the invention.

FIG. 5 is flow chart illustrating an example process for initializing a system 300 in which services and or features are distributed as described above. Thus, the flow chart of FIG. 5 will be described in relation to domain 400 of FIG. 4, which can be viewed as a remote domain comprising various core services 410 and non-core services 408. The services illustrated in FIG. 4 can, however, be local to domain 400 or remote, depending on the situation as described below.

Before any services can be created a media switch 404 should be initialized in step 502. Media switch 404 can be initialized as a master media switch. A master media switch can be distinguished from other media switches in that a master media switch performs additional functions, such as the endpoint locating function, for its local domain. Each domain should have a component providing endpoint address information. Thus, either a master media switch 404, as in FIG. 4A, a media switch 404 with an endpoint locator service 416, as in FIG. 4B, or some other means for determining an endpoint addresses corresponding to each endpoint in a domain should be included in domain 400.

In step 502, therefore, a master media switch 404 can be started and once it is fully initialized, one or more services can be started. Each master media switch 404 can be configured to read a configuration file to determine the list of services that it should load locally, i.e., from services available in domain 400.

The only required local service can be media switch service 406, which is always loaded, in step 504, by media switch 404 and allows for administration and management of media switch 404. In many embodiments, media switch 404 is not itself addressable endpoint, but media switch service 406 provides an addressable endpoint that can interact with media switch 404.

Other services can be loaded locally. Thus, in step 506, it is determined if any other services need to be loaded. If there are none, media switch 404 can simply wait until an endpoint 402 connects with media switch 404 (see FIG. 6).

Locally loaded services can require no authentication, so the sequence for such loads can be less important than in the distributed scenario. In a distributed configuration, however, the starting of services must be sequenced correctly to ensure that all necessary resources are in place as each service connects in sequence. The first service to connect must be authentication service 414 in step 508. All endpoints 402, including services, in system 400 can be validated, or authenticated, with the exception of the first authentication service 414 loaded in step 508. On receipt of an attach message from authentication service 414, media switch 404 discovers that there is no authentication service currently attached. As a result, media switch 404 allows authentication service 414 to attach. To address security concerns media switch 404 can, depending on the embodiment, be configured to accept authentication service connections only from a list of trusted endpoint addresses, e.g., IP addresses, particularly for the initial connection.

Once authentication service 414 is attached, it can be configured to attempt to publish its presence by sending a message to presence service 412. But because presence services 412 is not attached yet, the message delivery fails. Thus, authentication service 414 can be configured to schedule a retry attempt.

Presence service 412 can be loaded next, in step 510. Presence service 412 can be configured to attach to media switch 404 and authenticate normally, since there is an authentication service 414 attached at this point. Presence service 412 can be configured to then publish its own presence with itself. As with media switch 404, presence service 412 can be a clustered component, which needs to share and synchronize certain data elements across all instances of the service. To accomplish this, each instantiation of presence service 412 can be configured to attempt an additional attachment as a 'master presence service'. The master presence service can be configured to provide any necessary synchronized access to shared state. The first presence service 412 to connect succeeds in its attempt to become the master presence service. Any subsequent presence service 412 attempting to become a master presence master should fail, since each endpoint connected has a unique address and a master presence service is already connected. Thus, the system 400 can be configured to allow only a single master presence service at a time.

At some point, the first authentication service 414 can retry its presence publication attempt and, upon successful publication, the core services 410 for domain 400 will be in place. At this point, additional instances of authentication service 414 and presence service 412 can be loaded in steps 512 and 514 respectively. Then, in step 516 all non-core services 408 can be loaded. In most embodiments, non-core services 408 can be loaded in any order.

Figure 6:
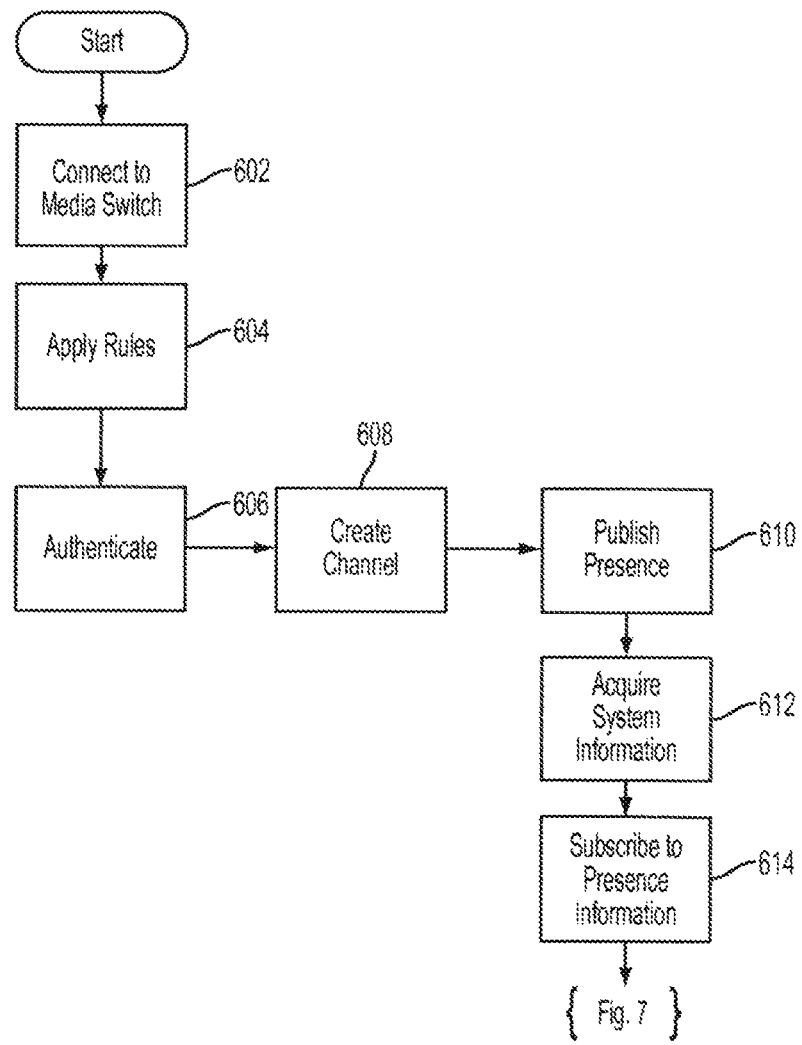
FIG. 6 is a flow chart illustrating an example method for connecting with a media switch in accordance with one embodiment of the invention.

FIG. 6 is a flow chart illustrating an example method whereby endpoints 402 interface with media switch 404 in accordance with one embodiment of the systems and methods described herein. Endpoints 402 can connect to media switch 404 in step 602. In one embodiment, endpoints 402 connect using a media peer protocol, either directly over TCP/IP or tunneled over HTTP.

Once connected in step 602, endpoints 402 can be configured, depending on the embodiment, to send a media switch protocol layer attach message, which can include an endpoint ID and a password. Media switch 404 can be configured to apply, in step 604, a set of rules, or heuristics, to verify that the connection of endpoint 402 is permissible. One rule can, for example, ensure that the endpoint ID is unique across all current connections. Another rule can, for example, authenticate the endpoint ID and password in step 606.

The authentication of step 606 can be provided by authentication service 414. Authentication service 414 can, in certain embodiments, be viewed as an application toolset component. Further, in certain embodiments media switch 404 is not able to interface with authentication service 414 directly. For example, media switch 404 can be configured to use a media switch protocol, while application toolset components interact using an application messaging framework. Thus, to communicate with authentication service 414, media switch 404 can be configured to load a dynamically configured authenticator object, which can be an application toolset component that knows how to interact with authentication service 414 to perform authentications, e.g., in step 606.

Once authenticated in step 606, media switch 402 can create a channel for endpoint 402 in step 608. Media switch 404 can also be configured to return a success response to endpoint 402. Each time a new media switch channel is created, media switch 404 can be configured to iterate through any dynamically configured channel hooks. In this context, a "hook" is an action taken or function invoked automatically in response to another action having taken place. One of these channel hooks, the "ChannelAutoPresence" hook, can be an application toolset component responsible for notifying presence service 412 of all endpoints 402 connected in the system. For example, the "ChannelAutoPresence" hook can be configured to send a publish command to presence service 412, which can set the administrative level of presence for endpoint 402 that will allow the system to be aware of endpoint 402, but that does not necessarily publicly announce the presence of endpoint 402 to other endpoints.

Endpoint 402 can also be configured to publish its presence state explicitly in step 610, e.g., by sending a publish command to presence service 412. Presence service 412 can be configured to modify the presence state for endpoint 402 and also set any other presence attributes that endpoint 402 wishes to have publish.

Endpoint 402 can also requests account capabilities and system information in step 612, e.g., via a "GetAccountInfo" command, which it can send to authentication service 414. In response, authentication service 414 can be configured to look up account information and capabilities settings, and return them to endpoint 402. Endpoint 402 can be configured, for example, to use the information to enable/disable functionality based on the settings of the associated account.

In step 614, endpoint 402 can then, for example, subscribe to a service such as a conference service. For example, in one embodiment, endpoint 402 can issue a subscribe command to presence service 412, specifying the identity of the conference endpoint. The conference endpoint only exists if a conference is started for the account associated with the endpoint. When the conference comes online, presence service 412 can notify endpoint 402, e.g., via a "SubscribeEvent" message. This allows a participant to be notified if his conference ID is in use, which typically means that participant's are attempting to join his conference.

Figure 7:
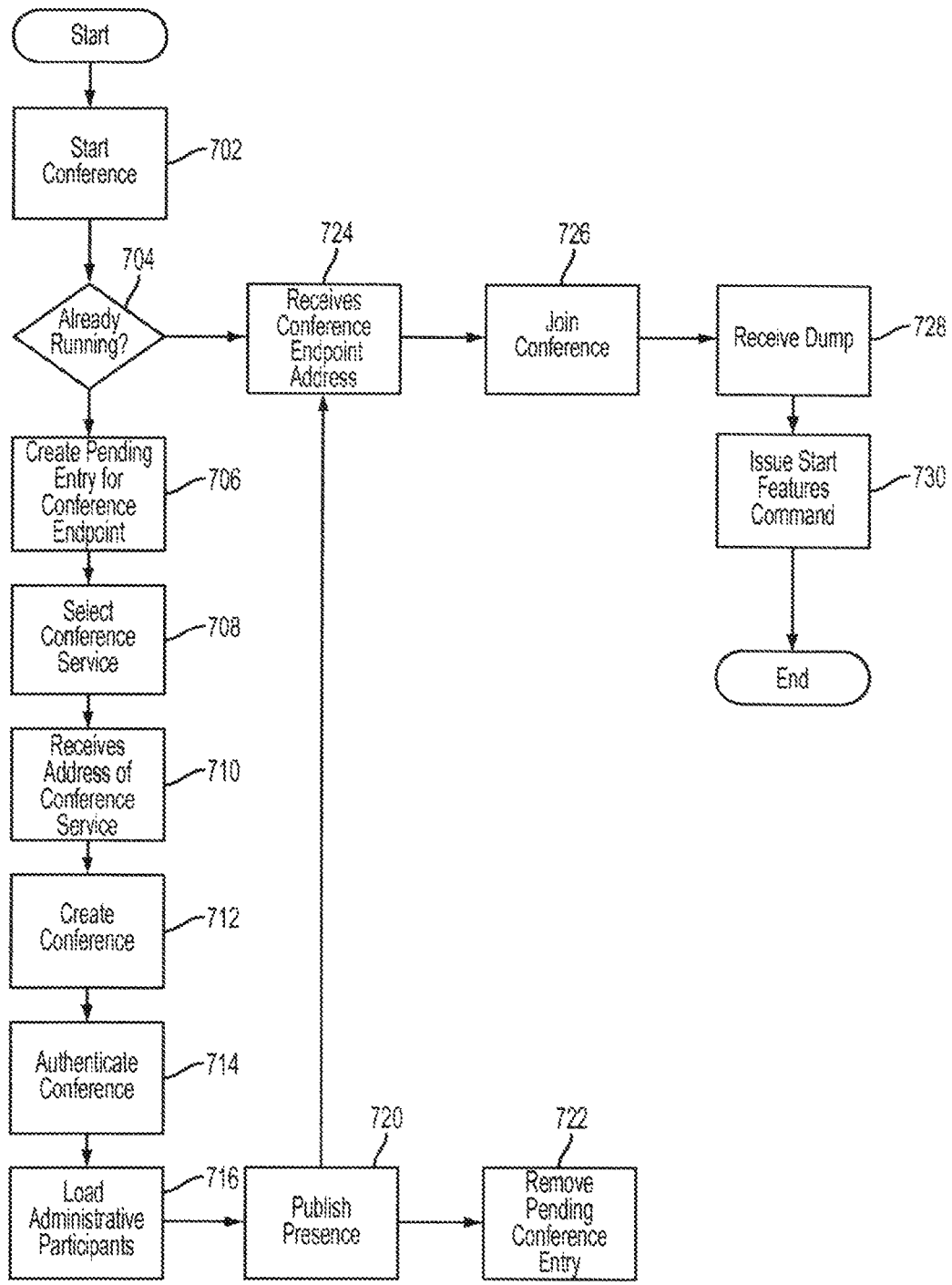
FIG. 7 is a flow chart illustrating an example method for establishing a conference in a collaborative communication system, in accordance with one embodiment of the invention.

FIG. 7 is a flow chart illustrating one example method for initiating a conference within a collaborative communication system configured in accordance with the systems and methods described herein. Thus, once an endpoint is connected using the process of FIG. 6, it can be configured to display an interface that allows the participant to perform various actions, including starting or joining a conference. If the participant wishes to start a conference using his account, he can, for example, "click" a "Start Conference Link," in step 702.

Endpoint 402 can be configured to then determine, in step 704, whether the conference is running. If it is already running, then endpoint 402 can receive the address for the endpoint associated with the conference in step 714. If the conference is not already running, then presence service 412 can be configured to create a pending entry for a conference endpoint, in step 706, and to select a conference service, in step 708. As described above, selecting a conference service can comprise presence service 412 locating a conference service that has a "green light" status. Depending on the implementation, the selected conference service can be local to domain 400 or remote, e.g. within a service provider's domain 310.

In step 710, presence service 412 can receive an address associated with the elected conference endpoint and create the conference session, in step 712. In step 714, the conference session create din step 712 can be authenticated, e.g., by authentication service 414. Then, in step 716, any administrative participants can be loaded.

Thus, endpoint 402 can be provided the endpoint address, received in step 710, of the available conference service. For example, endpoint 402 can be configured to issue a "PredictiveLookupService" command message to presence service 412, specifying arguments for both the conference endpoint and the type of service capable of hosting this endpoint.

Presence service 412 can be configured to then provide synchronization for looking up the endpoint of the conference, or selecting a destination for the endpoint of the conference if it doesn't already exist. In the latter case, presence service 412 can be configured to create a "Pending Presence Entry" (step 706) for the conference endpoint, so that any other endpoints 402 that attempt to locate the conference endpoint will be directed to the same conference service. Implementing this two-part query in a single message allows presence service 412 to resolve potential race issues that can occur when multiple endpoints are attempting to start/join the same conference simultaneously. Presence service 412 can then returns the address of the chosen conference service to endpoint 402 (step 710).

If the conference has not yet been started, then endpoint 402 can be configured to issue, e.g., a "CreateConference" command to the returned conference service endpoint. The conference service can receive the command and create a conference object for the given conference ID. The conference object can be configured to attach to media switch 404 with a unique endpoint. Media switch 404 can be configured to authenticate the conference object, and thereby the conference service, in step 714 using authentication service 414.

Each conference service can load, in step 716, a set of 'administrative participants', which are configuration dependent listeners that receive all conference related events broadcast by the conference service. For example, a conference logging service can be a required administrative participant that records all conference events to a database, e.g., for billing and reporting purposes. The conference logging service can, for example, be a distributed service, and an available instance of it can be located via presence service 412 in the same manner, for example, that the conference service was located.

The conference service can interact with presence service 412, e.g., by issuing a "LookupService" command to locate an available endpoint of entity type conference logging service. Presence service 412 can return an endpoint ID of a conference logging service to the conference service in response to the received command. The conference service can be configured to add the endpoint to its list of administrative participants. The administrative participants can, for example, include the conference logger service, any administrative client that is monitoring the conference, and any other listeners that are appropriate, such as a conference recorder client, which records all conference events for future playback.

A conference logging service can be configured to receive and store data to be used as needed, for example, in billing, reporting, or recovering and restarting failed sessions. Such a conference logging service can be open and configured to interface with a variety of external systems, e.g., for billing or reporting.

The conference service can also publish its presence in step 720, e.g., via a "publish command" sent to presence service 412. When presence service 412 receives the publish command, it can remove the pending presence entry and replace it with an actual presence entry. In certain embodiments, if presence service 412 doesn't receive a publish command within a predetermined time interval, then the pending presence entry will timeout and be removed.

The conference service can return a success response to endpoint 402, along with the endpoint ID of the newly created conference. At this point the conference is created, but endpoint 402 still has not joined it. Endpoint 402 can be configured to join the conference in step 726. For example, endpoint 402 can send, e.g. a "ModeratorJoin" command to the conference service, causing the conference service to verify that endpoint 402 is the owner of the associated account, and to add endpoint 402 to the list of conference participants. Most conference activities, such as a participant joining the conference, can generate events, which are broadcast to all participants in the conference, and also to any administrative recipients. Further, each time a participant joins the conference they can be sent a state dump, i.e. a complete record of the conference history, in step 728, which includes all conference events necessary to describe the current state of the conference.

Once joined, endpoint 402 can issue "StartFeature" commands, in step 730, to the conference object for any features that will be used in the conference. The conference object can receive these commands and, e.g., using a feature factory, instantiate each feature. These features can be created internal to the conference process, or they can run external to the conference, e.g., hosted by a feature service. The details of feature creation, i.e., internal vs. external, can be encapsulated in the feature factory, and neither the conference service nor the feature need be aware of where the feature resides. For out-of-process features, for example, the conference/feature interface is implemented via proxy objects that translate interface-method calls to messages, and vice versa.

While certain embodiments of the inventions have been described above, it will be understood that the embodiments described are by way of example only. Accordingly, the inventions should not be limited based on the described embodiments. For example, while embodiments involving generation of and participation in a conference were described above, it should be clear that the systems and methods described herein apply equally to embodiments for the generation and creation of other types of services. Thus, the scope of the inventions described herein should only be limited in light of the claims that follow when taken in conjunction with the above description and accompanying drawings.

What is claimed:

1. A method, comprising:
   loading services by a media switch;
   if it is determined that other services are to be loaded, loading the other services by the media switch and ensuring a first service of the other services to load is an authentication service that is accepted from at least one trusted endpoint address;
   wherein loading the other services comprises loading a presence service which maintains information on all endpoints associated with the media switch via an endpoint locator service;
   wherein the presence service maintains information comprising at least one of entity availability that indicates a service's ability to accept connections or entity type that indicates one or more services offered by an endpoint; and
   wherein the presence service is configured to publish its own presence with itself when loaded, and is further configured to attempt an additional attachment as a master presence service that is awarded to a presence service that first attempts to be the master presence service, wherein the master presence service is configured to provide synchronized access information to shared data elements.

2. The method of claim 1, wherein loading the authentication service comprises initiating the authentication service and the authentication service attempting to publish its presence with the presence service.

3. The method of claim 2, further comprising the authentication service receiving an indication that the attempt to publish its presence failed and the authentication service again attempting to publish its presence after the presence service is loaded.

4. The method of claim 1, further comprising loading an additional authentication service.

5. The method of claim 1, further comprising loading an additional presence service.

6. The method of claim 1, wherein loading the other services comprises loading non-core services.

7. The method of claim 1, further comprising:
   reading a configuration file to determine the list of services to be loaded by the media switch; and
   reading the configuration file to determine a list of the other services that should be loaded.

8. The method of claim 1, further comprising loading the other services sequentially.

9. A system, comprising:
   a media switch configured to load services;
   wherein the media switch is configured to determine if other services are to be loaded and if so, the media switch loads the other services and ensures a first service of the other services to load is an authentication service that is accepted from at least one trusted endpoint address;
   wherein the media switch loads the other services comprises a presence service being loaded which maintains information on all endpoints associated with the media switch via an endpoint locator service;
   wherein the presence service maintains information comprising at least one of entity availability that indicates a service's ability to accept connections or entity type that indicates one or more services offered by an endpoint, and wherein the presence service is configured to publish its own presence with itself when loaded, and is further configured to attempt an additional attachment as a master presence service that is awarded to a presence service that first attempts to be the master presence service, wherein the master presence service is configured to provide synchronized access information to shared data elements.

10. The system of claim 9, wherein the authentication service to load comprises the authentication service being initiated and the authentication service attempts to publish its presence with the presence service.

11. The system of claim 10, wherein the authentication service is configured to receive an indication that the attempt to publish its presence failed and to attempt to publish its presence after the presence service is loaded.

12. The system of claim 9, wherein the other services being loaded comprises loading an additional authentication service.

13. The system of claim 9, wherein the other services being loaded comprises loading an additional presence service.

14. The system of claim 9, wherein the other services being loaded comprises loading non-core services.

15. The system of claim 9, wherein the media switch service is configured to allow the media switch to communicate as an addressable endpoint.

16. The system of claim 9, wherein the media switch is configured to read a configuration file to determine the list of services to be loaded by the media switch and to determine a list of the other services that should be loaded.

17. The system of claim 9, wherein the other services are loaded sequentially.

18. A non-transitory computer readable medium comprising instructions that when read by at least one processor perform:

loading services by a media switch;

if it is determined that other services are to be loaded, loading the other services by the media switch and ensuring a first service of the other services to load is an authentication service that is accepted from at least one trusted endpoint address;

wherein loading the other services comprises loading a presence service which maintains information on all endpoints associated with the media switch via an endpoint locator service;

wherein the presence service maintains information comprising at least one of entity availability that indicates a service's ability to accept connections or entity type that indicates one or more services offered by an endpoint; and wherein the presence service is configured to publish its own presence with itself when loaded, and is further configured to attempt an additional attachment as a master presence service that is awarded to a presence service that first attempts to be the master presence service, wherein the master presence service is configured to provide synchronized access information to shared data elements.

19. The non-transitory computer readable medium of claim 18, wherein loading the authentication service comprises initiating the authentication service and the authentication service attempting to publish its presence with the presence service.

20. The non-transitory computer readable medium of claim 19, further comprising the authentication service receiving an indication that the attempt to publish its presence failed and the authentication service again attempting to publish its presence after the presence service is loaded.

* * * * *